United States Patent
Yang

(10) Patent No.: US 8,433,807 B2
(45) Date of Patent: Apr. 30, 2013

(54) METHOD, SYSTEM, AND APPARATUS FOR PROCESSING ACCESS PROMPT INFORMATION

(75) Inventor: Zhenting Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 12/780,711

(22) Filed: May 14, 2010

(65) Prior Publication Data

US 2010/0223661 A1 Sep. 2, 2010

Related U.S. Application Data

(63) Continuation of application No. PCT/CN2008/073082, filed on Nov. 17, 2008.

(30) Foreign Application Priority Data

Nov. 16, 2007 (CN) .......................... 2007 1 0188318

(51) Int. Cl.
*G06F 15/173* (2006.01)
(52) U.S. Cl.
USPC ................................ 709/228; 709/227; 726/4
(58) Field of Classification Search .......... 709/227–228, 709/225, 229; 726/1–6, 26–27
See application file for complete search history.

(56) References Cited

U.S. PATENT DOCUMENTS

| 6,782,004 | B1 * | 8/2004 | Brusilovsky et al. ......... 370/467 |
| 7,561,527 | B1 * | 7/2009 | Katz et al. .................... 370/241 |
| 7,860,981 | B1 * | 12/2010 | Vinokour et al. ............. 709/227 |
| 2002/0154627 | A1 * | 10/2002 | Abrol et al. ................... 370/352 |
| 2005/0094627 | A1 | 5/2005 | Gass |
| 2006/0009213 | A1 * | 1/2006 | Sturniolo et al. .......... 455/426.1 |
| 2006/0294242 | A1 * | 12/2006 | Ozaki et al. ................... 709/227 |
| 2007/0165515 | A1 * | 7/2007 | Vasseur ......................... 370/216 |
| 2007/0180104 | A1 * | 8/2007 | Filsfils et al. ................. 709/224 |
| 2007/0189177 | A1 * | 8/2007 | Zhai ............................... 370/244 |
| 2007/0203990 | A1 * | 8/2007 | Townsley et al. ............. 709/206 |

(Continued)

FOREIGN PATENT DOCUMENTS

| CN | 1310410 A | 8/2001 |
| CN | 1585362 A | 2/2005 |

(Continued)

OTHER PUBLICATIONS

State Intellectual Property Office of the People's Republic of China, International Search Report in International Patent Application No. PCT/CN2008/073082 (Feb. 26, 2009).

(Continued)

*Primary Examiner* — Abdullahi Salad

(57) ABSTRACT

A method, system, and apparatus for processing access prompt information in an IP session are disclosed. The method includes: managing the state of an IP session in an IP session process, and providing access prompt information of the IP session, where the access prompt information includes an IP session termination cause, or advertisement information or accounting information of the IP session, or any combination thereof; adding the access prompt information to an IP session control signaling message; and sending the IP session control signaling message that carries the access prompt information to a receiver so that the receiver can perform corresponding operations according to the access prompt information.

5 Claims, 8 Drawing Sheets

U.S. PATENT DOCUMENTS

| | | | |
|---|---|---|---|
| 2007/0217394 A1 | 9/2007 | Greene et al. | |
| 2008/0037436 A1* | 2/2008 | Liu | 370/250 |
| 2008/0095143 A1* | 4/2008 | Lai | 370/352 |
| 2009/0150984 A1* | 6/2009 | Dalton et al. | 726/7 |

FOREIGN PATENT DOCUMENTS

| | | |
|---|---|---|
| CN | 1647481 A | 7/2005 |
| CN | 1901459 A | 1/2007 |
| CN | 101304406 A | 11/2008 |
| EP | 1126663 A2 | 8/2001 |
| WO | WO 03/100578 A2 | 12/2003 |

OTHER PUBLICATIONS

Written Opinion of the International Searching Authority in corresponding PCT Application No. PCT/CN2008/073082 (Feb. 26, 2009).

1st Office Action in corresponding Chinese Application No. 200710188318.7 (Aug. 31, 2011).

Extended European Search Report in corresponding European Application No. 11181350.7 (Nov. 28, 2011).

Extended European Search Report in corresponding European Application No. 08851466.6 (Nov. 23, 2010).

Dec et al., "Subscriber Sessions," DSL Forum Working Text WT-146 Draft Version 2.54, Jul. 18, 2007, Architecture and Transport Working Group.

Lior et al., "Interworking of Protocol for Carrying authentication for Network Access (PANA) and Remote Authentication Dial in User Service (RADIUS)," Feb. 9, 2005, Internet Society, Reston Virginia.

Voigt et al., "Layer 2 Control Mechanism for Broadband Multi-Service Architectures," DSL Forum Working Text WT-147 Draft Version 1.6, Jun. 13, 2007, Architecture and Transport Working Group.

Rejection Decision in corresponding Chinese Patent Application No. 200710188318.7 (Jul. 3, 2012).

* cited by examiner

US 8,433,807 B2

METHOD, SYSTEM, AND APPARATUS FOR PROCESSING ACCESS PROMPT INFORMATION

CROSS-REFERENCE TO RELATED APPLICATIONS

This application a continuation of International Application No. PCT/CN2008/073082, filed on Nov. 17, 2008, which claims priority to Chinese Patent Application No. 200710188318.7, filed on Nov. 16, 2007, both of which are hereby incorporated by reference in their entireties.

FIELD OF THE INVENTION

The present invention relates to the Internet Protocol (IP) session field, and in particular, to a method, system, and apparatus for processing access prompt information in an IP session.

BACKGROUND OF THE INVENTION

With the popularity of the broadband network, management and control on broadband access become an important part of the broadband network management and control. A general mode of managing and controlling broadband access is to set up a session for controlling and managing a User Equipment (UE) that accesses, including authentication, authorization and accounting for the UE. At present, the main mode of managing and controlling broadband access is to set up a Point to Point Protocol (PPP) session to control and manage the access, thus providing a broadband access mode for the UE and enabling convenient control, management and accounting for the access. However, the PPP session based access mode has limitations, for example, lack of flexible support.

As a current trend, the IP session based access mode is used in place of the PPP session based access mode to control and manage the broadband access.

The IP session represents an access session of the broadband network associated with an IP address. The IP session is equivalent to a PPP session. The IP session is generally terminated at an IP edge device. That is, the IP session is a session connection set up between the UE and the IP edge device. The IP address of the IP session is designed to identify the key part of the parameters of the IP session. Generally, the IP address of the IP session is allocated through a Dynamic Host Configuration Protocol (DHCP) server dynamically. The IP session is designed to manage and control the UE access on a broadband network, for example, authentication, authorization, and accounting. An IP session involves these processes: setup and generation of the IP session, keep-alive or state detection of the IP session, and termination of the IP session.

At present, some technical solutions are provided for setting up, detecting, keeping alive, and terminating an IP session. Because the IP session is designed to control and manage broadband access, plenty of access prompt information occurs in the process of controlling and managing the broadband access, for example, an IP session disconnection cause, and an IP session setup failure cause. Such access prompt information is very important for diagnosing the IP session, prompting the UE in the IP session, or backing up logs of other servers on the network side.

However, the inventor of the present invention discovers that the prior art provides no method for processing the access prompt information in an IP session, which hinders the operation, administration, and maintenance for the broadband access, and makes the UE in the IP session or other servers on the network side unable to obtain the prompt information in time or take necessary measures to manage the IP session, thus deteriorating the experience of the user who uses the UE and increasing the operator's cost for maintaining the IP session.

SUMMARY OF THE INVENTION

The embodiments of the present invention provide a method for processing access prompt information, and this method enables processing of access prompt information in an IP session.

The embodiments of the present invention provide a system for processing access prompt information, and this system enables processing of access prompt information in an IP session.

The embodiments of the present invention provide an apparatus for processing access prompt information, and this apparatus enables processing of access prompt information in an IP session.

The technical solution under the present invention is implemented in the following way:

A method for processing access prompt information includes:
managing the state of an IP session during an IP session process, and providing access prompt information of the IP session, where the access prompt information including at least one of: an IP session termination cause, advertisement information and accounting information of the IP session;
adding the access prompt information to an IP session control signaling message; and
sending the IP session control signaling message that carries the access prompt information to a receiver so that the receiver can perform corresponding operations according to the access prompt information.

A communication system includes:
an IP edge device, configured to: manage the state of an IP session during an IP session process, obtain access prompt information of the IP session, add the access prompt information of the IP session to an IP session control signaling message, and send the IP session control signaling message to a receiver, where the access prompt information includes at least one of: an IP session termination cause, advertisement information and accounting information of the IP session; and
the receiver, configured to: receive the IP session control signaling message sent by the IP edge device, and perform corresponding operations according to the access prompt information carried in the IP session control signaling message.

An apparatus for processing access prompt information includes:
a Gateway Session State Management Unit (GSSMU), configured to: manage the state of an IP session during an IP session process, and provide access prompt information;
an Access Info Catch Unit (AICU), configured to: obtain the access prompt information from the GSSMU, and instruct an Info Mapping Unit (IMU) to perform information mapping for the access prompt information;
the IMU, configured to perform information mapping for the access prompt information so that the access prompt information is mapped to an access prompt information code, or map the access prompt information to an IP session control signaling message of a specified type, and send the mapped access prompt information to a Gateway Session Signaling Process Unit (GSSPU); and the GSSPU, configured to add the mapped access prompt information to the IP session control signaling message, and send the IP session control signaling message to a receiver.

A computer program product provided in an embodiment of the present invention includes a program stored in a computer-readable storage medium. When being executed, the program performs the following steps:

managing the state of an IP session during an IP session process, and providing access prompt information of the IP session, where the access prompt information includes an IP session termination cause, or advertisement information or accounting information of the IP session, or any combination thereof;

adding the access prompt information to an IP session control signaling message; and sending the IP session control signaling message that carries the access prompt information to a receiver so that the receiver can perform corresponding operations according to the access prompt information.

In the technical solution under the present invention, the obtained access prompt information is carried in an IP session control signaling message which is sent to the receiver. In this way, the receiver can perform corresponding operations according to the access prompt information. Therefore, the method, system, and apparatus provided herein enable processing of access prompt information in an IP session, which facilitates the operation, administration, and maintenance for the broadband access through IP session based access, and enables the UE in the IP session or the policy server on the network side to obtain the prompt information in time and take necessary measures to manage the IP session, thus improving the experience of the user who uses the UE and decreasing the operator's cost for maintaining the IP session.

DETAILED DESCRIPTION OF THE EMBODIMENTS

To make the technical solution, objectives and merits of the present invention clearer, the following describes the embodiments of the present invention in more detail with reference to accompanying drawings.

An IP session is independent of access line technologies, and is set up between an IP edge device and a UE. The IP session is characterized by user-oriented access management and control. In the negotiation process of setting up, keeping alive, and terminating an IP session, the IP edge device and the policy server generate access prompt information for facilitating management, control, and use. In the embodiments of the present invention, to process the access prompt information in an IP session, the IP edge device manages the state of the IP session during the IP session process, obtains the access prompt information from a locally created directory or from another server on the broadband network, adds the access prompt information to an IP session control signaling message, and sends the IP session control signaling message to the receiver such as a UE and/or network-side policy server. The receiver performs the corresponding management according to the access prompt information carried in the IP session control signaling message.

In the embodiments of the present invention, the access prompt information includes but is not limited to: prompt information about IP session setup success, an IP session setup failure cause, an IP session termination cause, or advertisement information or user accounting information. The prompt information about IP session setup success may be prompt information about user login success. The IP session setup failure cause may be a user login failure cause. The IP session termination cause may be a user logout cause. The advertisement information may be an IP address of an advertisement portal on a broadband network or advertisement graph-text information. The user accounting information may be the remaining duration or remaining sum of the subscription account of the user.

Figure 1:
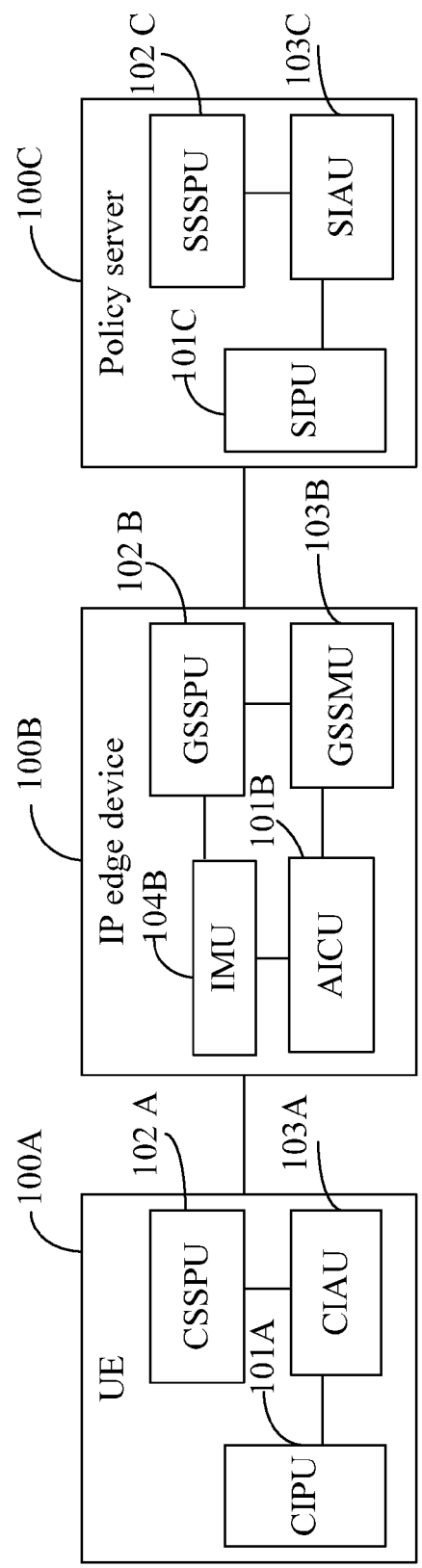
FIG. 1 shows an architecture of a system for processing access prompt information of an IP session in an embodiment of the present invention.

FIG. 1 shows an architecture of a system for processing access prompt information of an IP session in an embodiment of the present invention. The system includes a UE 100A and an IP edge device 100B, and may further include a policy server 100C.

The UE 100A and the IP edge device 100B are two sides of the IP session. That is, the UE 100A is an IP session client side, and the IP edge device 100B is an IP session network side. The UE 100A is connected through the access network to the IP edge device 100B, and the IP edge device 100B may be further connected to a policy server 100C.

The UE 100A includes: a Client Info Prompt Unit (CIPU) 101A, a Client Session Signaling Process Unit (CSSPU) 102A, and a Client Info Adoption Unit (CIAU) 103A. In the embodiments of the present invention, UEs include: a Personal Computer (PC), a Residential Gateway (RG), and a wireless portable terminal such as a mobile phone or a Personal Digital Assistant (PDA). The CSSPU 102A is configured to receive an IP session control signaling message that carries access prompt information, and send the IP session control signaling message to the CIAU 103A, where the IP session control signaling message may be a protocol message such as a DHCP message or a Bidirectional Forwarding Detection (BFD) protocol message. The CIAU 103A is configured to: parse the IP session control signaling message obtained from the CSSPU 102A, obtain the access prompt information, and then perform operations according to the access prompt information, for example, restart the IP session according to the prompt information such as a session disconnection cause, or send the access prompt information such as a session disconnection cause to the CIPU 101A, or save the prompt information such as a session disconnection cause. The CIPU 101A is configured to perform operations according to the access prompt information received from the CIAU, for example, display the session disconnection cause or the advertisement information to the user through a man-machine interface (or screen).

The IP edge device 100B includes: an AICU 101B, a GSSPU 102B, a GSSMU 103B, and an IMU 104B. In the embodiments of the present invention, examples of the IP edge devices are: Network Access Servers (NASs) such as a Broadband Remote Access Server (BRAS) and a Broadband Network Gateway (BNG), a service router, and an access gateway. The GSSMU 103B is configured to manage the state of the IP session, and obtain the access prompt information based on the IP session state management. The IP session state management includes: IP session setup management, IP session keep-alive management, and IP session termination management. For example, the GSSMU 103B sends the IP session termination cause to the AICU 101B, or the GSSMU 103B sends the information about IP session setup failure to the AICU 101B. The AICU 101B is configured to obtain the access prompt information, including: obtaining the access prompt information from the GSSMU 103B or from the network management control interface. After obtaining the access prompt information, the AICU 101B instructs the IMU 104B to perform information mapping for the access prompt information. The IMU 104B is configured to: perform information mapping for the access prompt information, and send the mapped access prompt information to the GSSPU 102B. For example, the IMU 104B converts the IP session termination cause into a termination cause code, and then instructs the GSSPU 102B to add the termination cause code to the specified IP session control signaling message. The GSSPU 102B is configured to: add the access prompt information to the specified IP session control signaling message, and then send the IP session control signaling message that carries the access prompt information to the UE and/or policy server.

The policy server 100C includes: a Server Info Prompt Unit (SIPU) 101C, a Server Session Signaling Process Unit (SSSPU) 102C, and a Server Info Adoption Unit (SIAU) 103C. In the embodiments of the present invention, a policy server may be an Authentication, Authorization and Accounting (AAA) server or a DHCP server. The SSSPU 102C is configured to receive the IP session control signaling message that carries access prompt information, and send the IP session control signaling message to the SIAU 103C, where the IP session control signaling message may be a Remote Authentication Dial-In User Service (RADIUS) protocol message. The SIAU 103C is configured to: parse the IP session control signaling message obtained from the SSSPU 102C, obtain the access prompt information, and then perform operations according to the prompt information, for example, stop IP session accounting according to the prompt information such as a session disconnection cause, or send the access prompt information such as a session disconnection cause to the SIPU, or save the prompt information such as a session disconnection cause; and perform session troubleshooting according to the prompt information such as a session disconnection cause. The SIPU 101C is configured to perform operations according to the access prompt information received from the SIAU, for example, display the session disconnection cause to the network administrator through a man-machine interface (or screen).

The method under the present invention is detailed below with respect to the units in the devices illustrated in FIG. 1.

Figure 2:
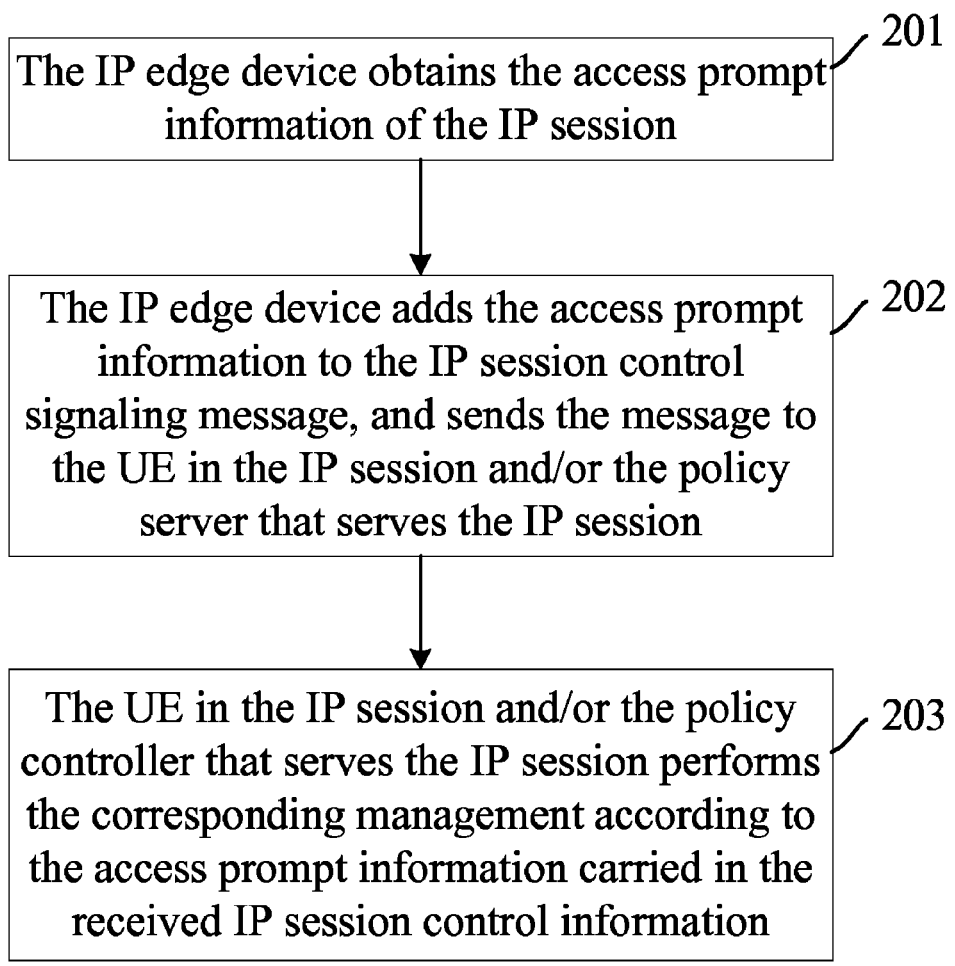
FIG. 2 is a flowchart of a method for processing access prompt information of an IP session in an embodiment of the present invention.

FIG. 2 is a flowchart of a method for processing access prompt information of an IP session in an embodiment of the present invention. The involved network entities include: a UE 100A, an IP edge device 100B, and/or a policy server 100C. The steps are as follows:

Step 201: The IP edge device 100B obtains the access prompt information of the IP session.

In this step, the AICU 101B of the IP edge device obtains the access prompt information of the specified IP session from the GSSMU 103B during the IP session process, and instructs the IMU 104B to perform access information mapping. The access prompt information comes from a local directory or another policy server on the network such as a DHCP server or an AAA server. The AICU 101B may instruct the IMU 104B by sending an operation instruction to the IMU 104B. The operation instruction includes the identifier of the IP session, and the access prompt information. The IP session identifier includes at least one of these items: IP address, UE MAC address, and UE ID.

Step 202: The IP edge device 100B adds the access prompt information to the IP session control signaling message, and sends the message to the UE in the IP session and/or the policy server that serves the IP session.

Specifically, the IMU 104B of the IP edge device 100B maps the access prompt information to the IP session control signaling message, and then instructs the GSSPU 102B to process the information. For example, the GSSPU 102B adds the access information to the IP session control signaling message, and then forwards the IP session control signaling message that carries the access prompt information to the UE 100A and/or policy server 100C.

In this step, the IMU 104B instructs the GSSPU 102B to insert or add the access prompt information or the codes corresponding to the access prompt information to the control signaling message specified by the IP session. The IMU 104B maps or converts the access prompt information into the prompt information codes. The GSSPU 102B inserts the access prompt information, determines the destination of the IP session control signaling message (namely, the IP client that the IP session control signaling message is destined for), and sends the IP session control signaling message. The step of determining the destination of the IP session control signaling message includes: searching for the destination of the IP session control signaling message according to the IP session identifier.

Step 203: The UE 100A in the IP session and/or the policy controller 100C that serves the IP session performs the corresponding management according to the access prompt information carried in the received IP session control information.

Specifically, the CIAU 103A of the UE 100A obtains the access prompt information carried in the IP session control signaling message from the CSSPU 102A, and/or the SIAU 103C of the policy controller 100C obtains the access prompt information carried in the IP session control signaling message from the SSSPU 102C, and performs the corresponding management. In this step, the access prompt information management performed by the UE 100 may include: the CIAU 103A displays the access prompt information to the user through the interface of the CIPU 101A, namely, prompts the user to take the corresponding measures; or the CIAU 103A records or stores the received access prompt information. The access prompt information management performed by the policy controller 100C includes: the SIAU 103C backs up the received access prompt information for subsequent maintenance, diagnosis, tracking and statistics.

The processing for the access prompt information in the IP session herein includes four parts, which are detailed below with reference to FIG. 3.

The process of setting up the IP session comes in two parts: setup success, and setup failure. As shown in FIG. 3, the part related to setup failure includes the following steps:

Step 301: The UE 100A attempts to access the network, namely, to set up an IP session.

Specifically, the CSSPU 102A of the UE 100A sends a session setup detection message to the IP edge device 100B.

In this step, the UE is an IP session client; the session setup detection message is an IP session control signaling message, for example, a DHCP discovery message, a DHCP request message, and a DHCP AUTH message.

Step 302: After receiving the session setup detection message, the GSSPU 102B of the IP edge device 100B instructs the GSSMU 103B to perform IP session setup processing such as authentication and authorization. If the attempt of setting up the IP session fails, the GSSMU 103B indicates or notifies the IP session setup failure cause to the AICU 101B.

Step 303: The AICU 101B of the IP edge device 100B notifies the session prompt information (IP session setup failure cause) to the IMU 104B. The IMU 104B converts the IP session setup failure cause into an error code, and then instructs the GSSPU 102B to insert or add the IP session setup failure cause or the error code to the notification of the IP session setup failure cause. Afterward, the GSSPU 102B sends the notification of the IP session setup failure cause to the UE.

The notification of the IP session setup failure cause is an IP session control signaling message, which may be a DHCP message or an Extensible Authentication Protocol (EAP) message. The IP session setup failure cause may be carried in an existing field or extension field of a DHCP message or EAP message.

The part related to setup success includes the following steps:

Step 304: The UE 100A attempts to access the network, namely, set up an IP session. For example, the UE 100A sends a message to the IP edge device 100B.

Step 305: After receiving the session setup detection message, the IP edge device 100B sets up an IP session. If the attempt of setting up the IP session succeeds, the IP edge device 100B obtains the prompt information about IP session setup success, and uses the information as access prompt information.

Step 306: The IP edge device 100B notifies the prompt information about IP session setup success to the UE 100A, for example, sends a session setup success notification that carries the prompt information about IP session setup success.

The session setup success notification is an IP session control signaling message, which may be a DHCP message or an EAP message. The prompt information about IP session setup success may be carried in an existing field or extension field of a DHCP message or EAP message. The prompt information about IP session setup success includes advertisement information and user accounting information.

Figure 3:
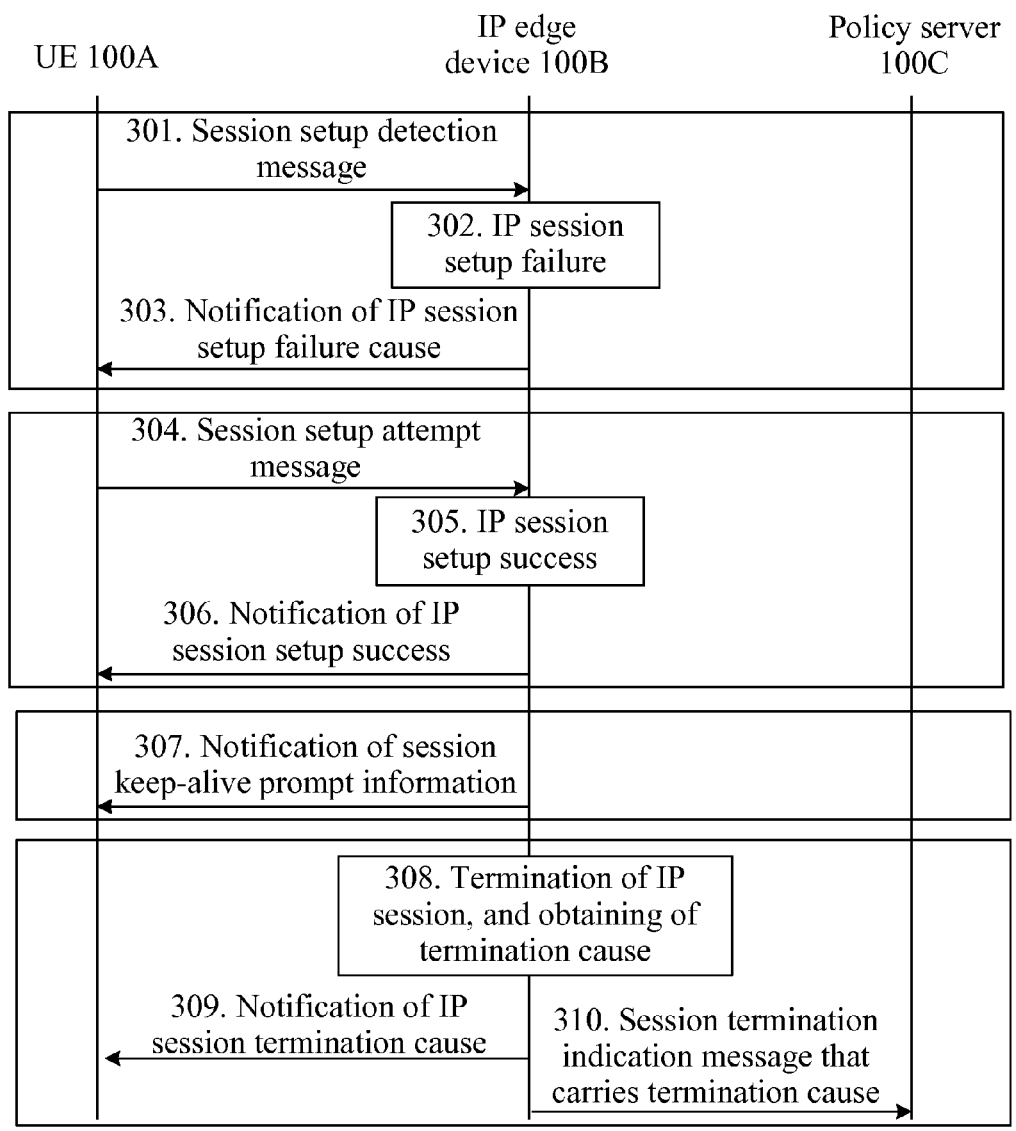
FIG. 3 is a flowchart of processing access prompt information of an IP session in an embodiment of the present invention.

During the process of the keeping the IP session alive, the interaction between the UE 100A and the IP edge device 100B includes the following steps, as shown in FIG. 3.

Step 307: The IP edge device 100B obtains the access prompt information, and sends a notification of session keep-alive access prompt information to the UE 100A of the IP session, where the notification carries the access prompt information. Specifically, the AICU 101B obtains the access prompt information, and notifies the session prompt information (advertisement information and accounting information) to the IMU 104B. The IMU 104B maps the session prompt information to the specified IP session control signaling message (keep-alive message), and then instructs the GSSPU 102B to insert or add the prompt information to the keep-alive message of the IP session. The GSSPU 102B sends the keep-alive message to the UE 100A.

The notification of the session keep-alive access prompt information is an IP session control signaling message. The access prompt information includes advertisement information and user accounting information. The notification of the session keep-alive access prompt information may be a Bidirectional Forwarding Detection (BFD) protocol message or a DHCP message. Specifically, an Option field may be added to the BFD control message, or BFD echo message, or DHCP echo message, or DHCP lease active message, and then the access prompt information is added to the Option field.

In the process of terminating the IP session, the interaction between the UE 100A and the IP edge device 100B includes the following steps, as shown in FIG. 3.

Step 308: The IP edge device 100B detects termination of the IP session. Upon discovering termination of the IP session, the GSSMU 103B performs termination processing for the IP session, and then indicates or notifies the IP session termination cause to the AICU 101B (namely, the IP edge device 100B obtains the termination cause). The IP session termination cause is a type of access prompt information.

Step 309: The IP edge device 100B sends a notification of the session termination cause to the UE 100A. The notification carries the IP session termination cause. Specifically, the AICU 101B of the IP edge device notifies the IP session termination cause to the IMU 104B. The IMU 104B converts the IP session termination cause into a termination cause code, and instructs the GSSPU 102B to insert or add the IP session termination cause or the code to the notification of the IP session termination cause. Afterward, the GSSPU 102B sends the notification of the IP session termination cause to the UE 100A.

In this step, the notification of the IP session termination cause is an IP session control signaling message, and may be a DHCP message or a BFD protocol message.

Step 310: The IP edge device 100B sends a session termination indication message to the policy server 100C. The session termination indication message carries the code of the IP session termination cause.

In this step, the session termination indication message is an IP session control signaling message, for example, a RADIUS accounting message or a subscriber authentication and authorization accounting protocol (Diameter protocol) message.

Step 309 may occur before, during or after step 310.

In the process of terminating the IP session in FIG. 3, the session termination indication message sent by the IP edge device 100B carries the code of the IP session termination cause. Specifically, the code may be carried through a parameter field in a RADIUS message or Diameter message, and the parameter field may be Field, Attribute, or Attribute-Value Pair (AVP). After receiving the session termination indication message, the policy server 100C performs management according to the IP session termination cause carried in the session termination indication message. The detailed process is exemplified below:

The IP edge device 100B adds the IP session termination cause to an Acct-Terminate-Cause field of an Accounting-Request message in a RADIUS protocol message or a Diameter protocol message, where the field is "Field", or "Attribute" or AVP; and then sends the Accounting-Request message to the policy server 100C. In this case, the policy server 100C may be an AAA server.

Alternatively, the IP edge device 100B adds the IP session termination cause to a Disconnect-Cause field (this field is an AVP) of a Disconnect-Peer-Request message in a Diameter protocol message, or to a Termination-Cause field of a Session-Termination-Request message or Accounting-Request message; and then sends the Diameter protocol message to the policy server 100C. In this case, the policy server 100C may be an AAA server.

the IP session termination cause on the interface. In another example, through an existing Option field or an extension Option field of the BFD protocol message, an Information Option field is added to the BFD control message. The Information Option field includes Info Type, Info Length, and Info Data. The advertisement type information, user accounting type information, or IP session termination cause type is added to the Information Option field of the BFD protocol message. The IMU 104B of the IP edge device 100B performs type code mapping, and the GSSPU 102B of the IP edge device 100B implements insertion of access prompt information, mapping from the IP session to the signaling message, and message sending. The mapping from the IP session to the signaling message may be the mapping to the IP session through the destination IP address of the IP header.

Figure 5:
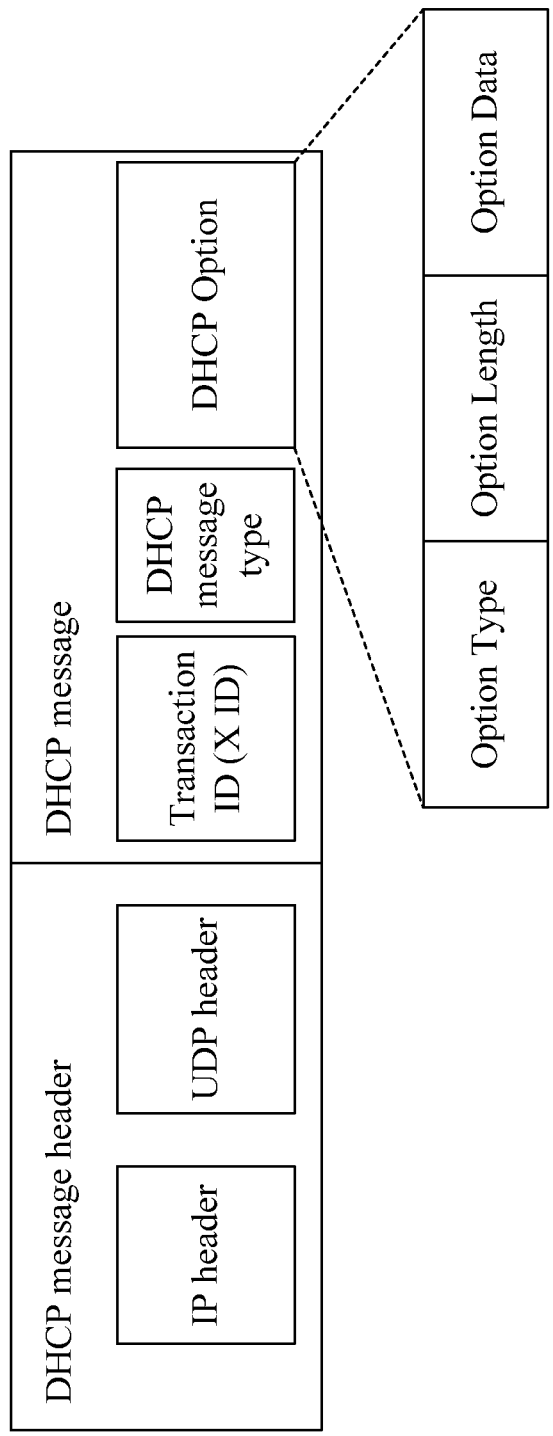
FIG. 5 shows a format of a DHCP message for processing access prompt information of an IP session in an embodiment of the present invention.

Alternatively, the IP edge device 100B sends a DHCP message that carries the access prompt information to the UE 100A. As shown in FIG. 5, the DHCP message includes a DHCP message header and a DHCP message body. The DHCP message header includes an IP header and a UDP header. The DHCP message includes a Transaction Identifier (XID), a DHCP message type, and a DHCP Option. The GSSPU 102B of the IP edge device 100B adds the prompt information as a DHCP Option field to the DHCP message. Table 1 describes the access prompt information supported by the DHCP message:

TABLE 1

| DHCP Message | Supported Prompt Information Option |
| --- | --- |
| DHCP discovery (Discover/SOLICIT) | The message sent by the UE to the IP edge is unable to carry an access prompt option. |
| DHCP Offer/ADVERTISE | The message can carry an access prompt information option such as advertisement type. |
| DHCP acknowledgement (Ack/REPLY) message | The message can carry an access prompt information option such as advertisement type and accounting type. |
| DHCP Reconfigure (Renew/Reconfigure) message | The message can carry an access prompt information option such as advertisement type and session termination cause type. |
| DHCP rejection (NAK) message | The message can carry an access prompt information option such as advertisement type, session termination cause type, and session setup failure type. |
| DHCP echo message or DHCP lease message | The message can carry an access prompt information option such as advertisement type, session termination cause type, and accounting type. |

Figure 4:
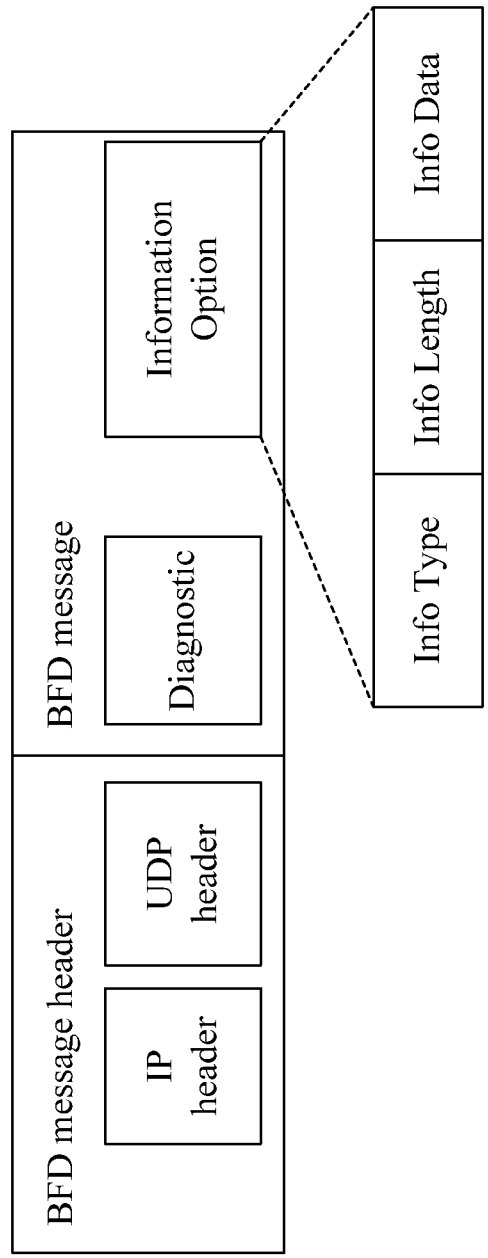
FIG. 4 shows a format of a BFD message for processing access prompt information of an IP session in an embodiment of the present invention.

In the process shown in FIG. 3, the IP edge device 100B adds the access prompt information to a BFD protocol message, DHCP message, or EAP message, and sends the message to the UE 100A. The detailed process includes the following steps:

The IP edge device 100B sends a BFD protocol message that carries the access prompt information to the UE 100A. As shown in FIG. 4, the BFD protocol message includes a BFD message header and a BFD message body. The BFD message header includes an IP header and a UDP header. The BFD message includes a Diagnostic field or an Information Option field. In the embodiment illustrated in FIG. 3, the GSSPU 102B of the IP edge device 100B adds the prompt information to the Diagnostic field or Information Option field, and then sends the message to the UE 100A. For example, the IMU 104B of the IP edge device 100B converts the IP session termination cause into a termination cause code, and then notifies the GSSPU 102B to add the code to the Diagnostic field 402A of the BFD protocol message. Afterward, the IP edge device 100B sends the BFD control message to the UE 100A. The UE 100A obtains the IP session termination cause from the BFD control message sent by the IP edge device 100B, and then performs management, for example, displays For example, the DHCP carries the prompt information in this way: The AICU 101B of the IP edge device 100B obtains the prompt information, and instructs the IMU 104B to perform information mapping (map the access prompt information to the access prompt information code, or map the access prompt information to the IP session control signaling message of the specified type). The IMU 104B instructs the GSSPU 102B to add the prompt information as a DHCP Option field to the DHCP message. The GSSPU 102B supports the DHCP relay or proxy to process the DHCP message, and the GSSPU 102B also supports processing of the DHCP message in DHCP server mode.

Alternatively, the IP edge device 100B supports the access prompt information to be carried in an existing field or an extension field of the EAP message. This field carries the access prompt information, and includes the user login failure cause or the IP session setup success information. In this embodiment, the EAP serves as a general authentication mechanism, and can be carried in a DHCP message or a User Datagram Protocol (UDP) message.

More embodiments are given below to expound the method under the present invention.

Figure 6:
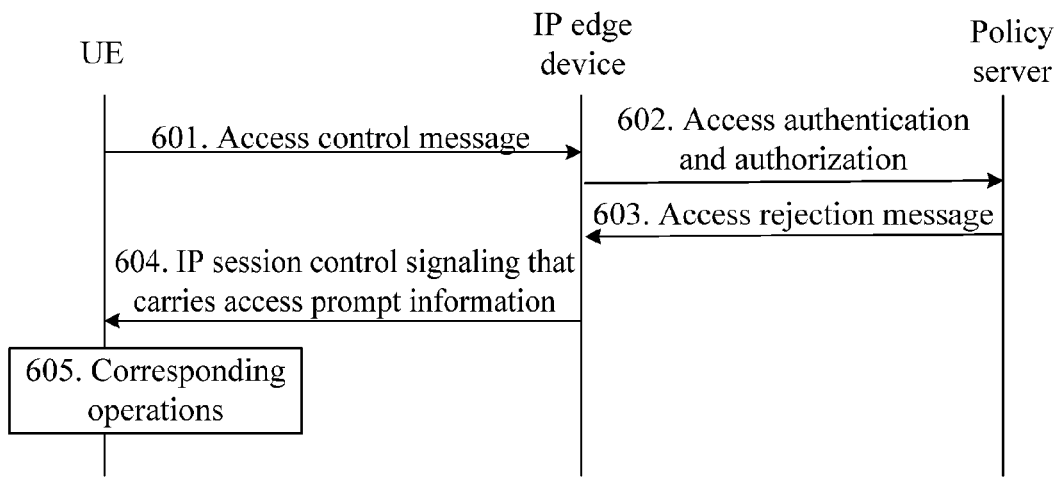
FIG. 6 shows how an IP edge device notifies a user login failure cause or an IP session setup failure cause to a UE in an embodiment of the present invention.

FIG. 6 shows how an IP edge device notifies a user login failure cause or an IP session setup failure cause to a UE in an embodiment of the present invention. The detailed steps are as follows:

Step 601: The UE sends an access control message to set up an IP session. The access control message carries the access session information.

In this embodiment, the access control message may be, but is not limited to: a DHCP discovery message, or a DHCP request message, or a DHCP AUTH message.

Step 602: After receiving the access control message sent by the UE, the IP edge device parses the access control message and obtains the access session information, and then performs access, authentication, and authorization processing.

In this step, the access session information includes, but is not limited to: user name, and UE address. The access, authentication, and authorization processing may be: sending a RADIUS Access-Request message to the policy server to perform authentication and authorization.

Step 603: After receiving the access, authentication, and authorization message sent by the IP edge device, the policy server performs authorization processing: if the authentication and authorization fail, the policy server returns an access rejection message to the IP edge device. The access rejection message carries the access rejection prompt information.

In this step, the access rejection message may be a RADIUS Access-Reject message, and the access rejection prompt information may include "password error" or a cause code (0x301). For example, the Reply-Message of the RADIUS Access-Reject message serves as access prompt information.

Step 604: The IP edge device receives the access rejection message returned by the policy server, obtains the access prompt information carried in the access rejection message, constructs an IP session control signaling message that carries the access prompt information and sends it to the UE.

In this embodiment, there are different causes for IP session setup failure. The cause may be mapped to a cause code, as shown in Table 2. Table 2 gives the mapping relations between the common IP session setup failure causes and the cause codes.

TABLE 2

| IP Session Setup Failure Cause | Cause Code |
| --- | --- |
| The user name or password is incorrect. | 0x301 (0x represents hexadecimal) |
| The balance of the subscription account of the user is not enough. | 0x302 |
| System resources are not enough. | 0x303 |
| Session configuration based on the Access Node Control Protocol (ANCP) or Layer 2 Control Mechanism (L2CM) fails. | 0x304 |
| The terminal address or identifier is illegal. | 0x305 |

In this step, the IP session control signaling message may further carry the access session information.

In this step, the IP session control signaling message that carries the access prompt information may be a DHCP Offer message, a DHCP Advertise message, a DHCP NAK message, or a DHCP AUTH message. The IP session control signaling message may carry an Option field. This field includes the access rejection prompt information or the cause code. If the IP session control signaling message is an EAP+ DHCP AUTH message (EAP is carried in the DHCP message for authentication, and "EAP+DHCP" may be regarded as a combination of EAP and DHCP), the access rejection prompt information may be included in the EAP message.

In this step, the IP edge device is responsible for mapping and association between the access rejection message sent by the policy server and the IP session control signaling message sent by the UE. Mapping refers to correspondence between the access rejection message and the sent IP session control signaling message. For example, when the received access rejection message is a DHCP discovery message, a DHCP Offer message is returned to the UE as a response; if the received access rejection message is a DHCP request message, a DHCP rejection message is returned to the UE as a response. Association refers to association of the information about the access session.

Step 605: The UE performs the corresponding management after receiving the IP session control signaling message that carries the access prompt information.

In this step, the management process is: The UE obtains the access prompt information from the DHCP Offer message, DHCP rejection message, or DHCP AUTH message that carries the access prompt information, for example, obtains access rejection prompt information or the cause code, and then converts the access prompt information into a string and displays it on the interface, or records the access prompt information.

Figure 7:
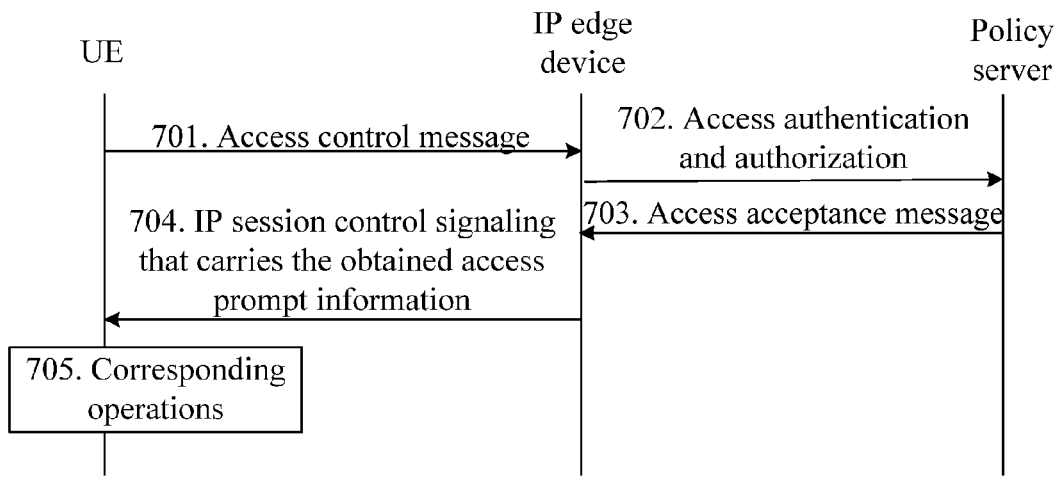
FIG. 7 shows how an IP edge device notifies information about user login success or IP session setup success to a UE in an embodiment of the present invention.

FIG. 7 shows how an IP edge device notifies user login success information or IP session setup success information to a UE in an embodiment of the present invention. The detailed steps are as follows:

Step 701: The UE sends an access control message to set up an IP session. The access control message carries the access session information.

Step 702: After receiving the access control message sent by the UE, the IP edge device parses the access control message and obtains the access session information, and then performs access, authentication, and authorization processing.

Step 703: After receiving the access, authentication, and authorization message sent by the IP edge device, the policy server performs authorization processing: if the authentication and authorization succeed, the policy server returns an access acceptance message to the IP edge device. The access acceptance message carries the access prompt information.

In this step, the access acceptance message may be a RADIUS Access-Accept message, and the access prompt information may be carried in a Reply-Message of a RADIUS Access-Accept message. The access prompt information may include user accounting information, for example, the remaining duration of the user, or the remaining sum of the account, and may also include advertisement information such as the IP address of the portal on a broadband network.

Step 704: The IP edge device receives the access acceptance message returned by the policy server, obtains the access prompt information carried in the access acceptance message, constructs an IP session control signaling message that carries the access prompt information and sends it to the UE.

In this step, the IP session control signaling message that carries the access prompt information is a DHCP Offer message, a DHCP Advertise message, a DHCP acknowledgement (ACK or Reply) message, or a DHCP AUTH message. The IP session control signaling message includes an Option field, which is designed to add the access prompt information obtained by the IP edge device from the access acceptance message and other access prompt information obtained by the IP edge device.

In this step, the acceptance prompt information obtained by the IP edge device may include user accounting information and advertisement information. The access prompt information includes the access prompt information collected by the IP edge device from a local directory or from other servers on the network. For example, the IP edge device obtains the access prompt information from other servers through the interface to such servers.

Step 705: The UE performs the corresponding management after receiving the IP session control signaling message that carries the access prompt information.

In this step, the detailed management process is: The CIAU of the UE obtains the access prompt information from the DHCP Offer message, DHCP acknowledgement message or DHCP AUTH message received from the CSSPU, for example, obtains the user accounting information or advertisement information, and then displays the access prompt information.

In this step, the CIAU starts a web browser according to the advertisement information (for example, an address of a portal) in the access prompt information (the browser here is a CIPU), and advertisement information such as a web page pops up.

Figure 8:
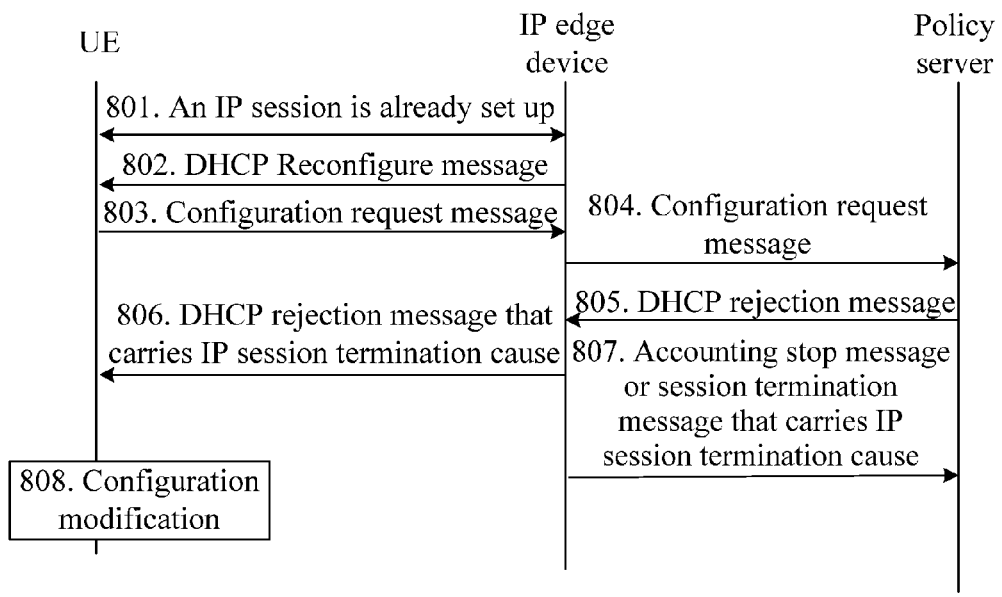
FIG. 8 shows how an IP edge device notifies an IP session termination cause to a UE or a policy server during an IP session process in an embodiment of the present invention.

FIG. 8 shows the first method about how an IP edge device notifies an IP session termination cause to a UE or a policy server during an IP session process in an embodiment of the present invention. The detailed steps are as follows:

Step 801: An IP session is already set up between the UE and the IP edge device.

Step 802: The IP edge device obtains an instruction or event of updating the IP session, sends a DHCP Reconfigure message to the UE, where the DHCP Reconfigure message is constructed locally or received from the DHCP server and carries access prompt information.

In this step, the update of the IP session information may be modification of the IP address configuration of the IP session.

The DHCP Reconfigure message may be a DHCP Forcerenew message. The DHCP update message includes access prompt information. The access prompt information may be a cause for terminating the IP session for the purpose of modifying the IP session configuration, and the access prompt information may be carried in a DHCP Option field.

Step 803: After receiving the DHCP Reconfigure message, the UE parses the DHCP Reconfigure message to obtain the access prompt information and know the IP session termination cause, and then sends a configuration request message to the IP edge device.

In this step, the configuration request message may be a DHCP request message.

Step 804: The IP edge device forwards the configuration request message from the UE to the DHCP server.

Step 805: After receiving the configuration request message, the DHCP server updates the IP session information, for example, modifies the IP address of the IP session that is set up, and sends a DHCP NAK message to the IP edge device.

Step 806. The IP edge device receives the DHCP NAK message from the DHCP server, performs termination processing for the IP session, and then forwards the DHCP NAK message to the UE. The IP edge device may add access prompt information such as an IP session termination cause to the DHCP NAK message to be forwarded.

Step 807: The IP edge device sends an accounting stop message or a session termination message to the AAA server. The message carries the IP session termination cause, and instructs the AAA server to back up the IP session termination cause. If the AAA server and the IP edge device are in the same physical entity, the AAA server may interact with the IP edge device through an Application Programming Interface (API). This step is optional, depending on the actual deployment.

In this step, the accounting stop message or the session termination message includes: the Accounting-Request message of the RADIUS protocol or the Diameter protocol, or the Session-Termination-Request message of the Diameter protocol.

Specifically, the IP edge device adds the IP session termination cause to the Termination-Cause field of the Session-Termination-Request message of the Diameter protocol, or to the Acct-Terminate-Cause field of the Accounting-Request message of the RADIUS or Diameter protocol.

Step 808: After receiving the DHCP NAK message, the UE obtains the access prompt information and modifies the configuration, for example, records or displays the access prompt information, or sets up an IP session again according to the access prompt information.

In FIG. 8, step 806 may occur before, during or after step 807.

Figure 9:
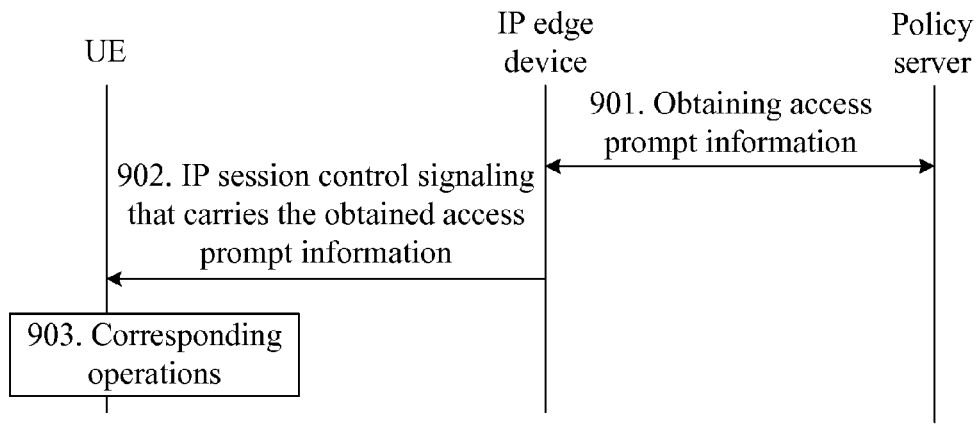
FIG. 9 shows how an IP edge device notifies access prompt information to a UE during a process of keeping alive an IP session in an embodiment of the present invention.

FIG. 9 shows how an IP edge device sends access prompt information to a UE during a process of keeping alive on an IP session in an embodiment of the present invention. The detailed steps are as follows:

Step 901: The IP edge device obtains the access prompt information, which includes advertisement information and user accounting information.

In this step, the IP edge device may obtain the access prompt information locally, or obtain the access prompt information from another server on the network. For example, the IP edge device obtains the user accounting information from the policy server through a RADIUS message, and obtains the access prompt information as triggered periodically or as triggered by an external application such as a network management command.

Step 902: The IP edge device sends the obtained access prompt information to the UE.

In this step, the access prompt information may be carried in a BFD protocol message. Specifically, an Option field may be added to the BFD control message or BFD echo message, and then the access prompt information is added to the Option field of the BFD control message or BFD echo message.

Step 903: The UE performs the corresponding processing. Specifically, the UE obtains the access prompt information from the received BFD protocol message, for example, obtains the user accounting information or advertisement information. The UE displays the user accounting information on the interface as a prompt to the user. The UE displays advertisement information according to the advertisement information such as an IP address of a portal.

Figure 10:
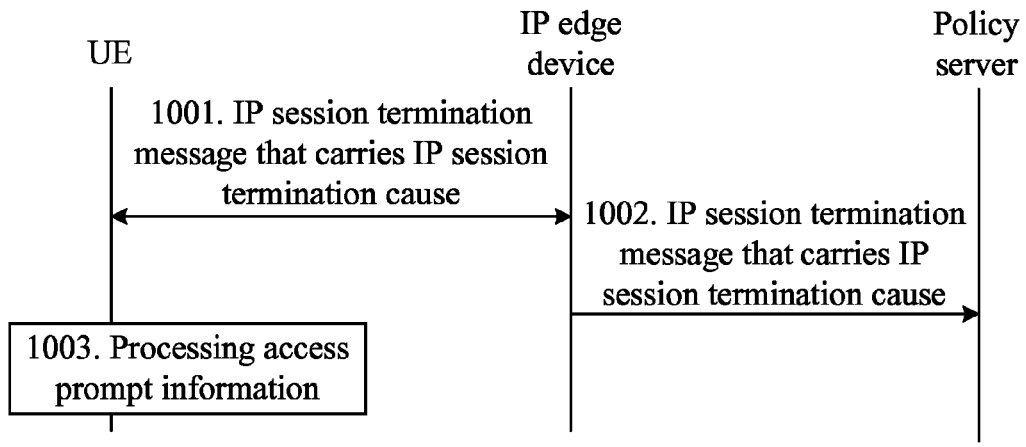
FIG. 10 shows how an IP edge device notifies an IP session termination cause or a user logout cause to a UE and a policy server in an embodiment of the present invention.

FIG. 10 shows the second method about how an IP edge device notifies an IP session termination cause or a user logout cause to a UE and a policy server in an embodiment of the present invention. The detailed steps are as follows:

Step 1001: The IP edge device detects the IP session termination instruction, and sends an IP session termination message via a session Keep-alive protocol to the UE. The IP session termination message carries an IP session termination cause.

In this embodiment, there are different session termination causes. Each cause is mapped to a cause code, as shown in Table 3. Table 3 gives common IP session termination causes.

TABLE 3

| IP Session Termination Cause | Cause Code |
|---|---|
| The balance of the subscription account of the user is not enough. | 0x401 |
| The session lifetime expires. | 0x402 |
| The system resources are not enough (for example, the bandwidth is not enough, or the resources of the IP edge device are not enough). | 0x403 |
| The user access is not authorized (for example, the user accesses an illegal website, or attacks the network maliciously). | 0x404 |
| The session is disconnected because of maintenance or management (for example, the administrator disconnects the session actively). | 0x405 |
| Re-authorization fails (for example, reconfiguration of the session policy fails, or IP session re-authentication fails). | 0x406 |
| The address lease expires (for example, the dynamic IP lease expires). | 0x407 |

In this step, the IP session termination instruction is sent by the network management system or the policy server, or sent locally at fixed time (for example, upon expiry of the IP session lifetime). The IP session termination instruction may be an instruction of active release of the session from the UE, for example, a DHCP release message from the UE.

In this step, the IP session termination message may be sent to the UE through a BFD control message. The IP session termination cause may be carried in the Diagnosis (Diag) code field of the BFD control message; namely, the IP edge device adds the IP session termination cause to the Diag code field of the BFD control message, and then sends a BFD control message of state change to the UE.

Step 1002: The IP edge device sends an IP session termination instruction (for example, an accounting stop message, or an IP session termination message) to the policy server, and adds the IP session termination cause to the accounting stop message or IP session termination message. This step is optional, depending on the actual deployment.

Step 1003: After receiving the IP session termination message, the UE performs the corresponding processing, for example, records or displays the IP session termination cause, or sets up an IP session again.

In the process shown in FIG. 10, step 1001 may occur before, during or after step 1002.

Supposing that the receiver includes a UE and/or a policy controller, the system and the apparatus provided in an embodiment of the present invention are detailed below.

Figure 11:
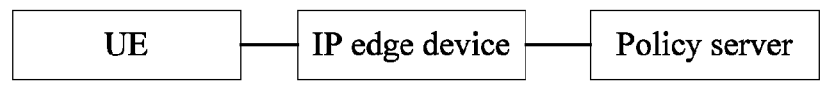
FIG. 11 shows a system for processing access prompt information in an IP session in an embodiment of the present invention.

As shown in FIG. 11, a system for processing access prompt information in an IP session includes:
an IP edge device, configured to: obtain access prompt information of an IP session, add the access prompt information of the IP session to an IP session control signaling message, and send the IP session control signaling message to a UE and/or a policy controller;
the UE, configured to: receive the IP session control signaling message sent by the IP edge device, and perform corresponding operations according to the access prompt information carried in the IP session control signaling message; and
the policy controller, configured to: receive the IP session control signaling message sent by the IP edge device, and perform corresponding operations according to the access prompt information carried in the IP session control signaling message.

The system may further include a server, which is configured to send the access prompt information of the IP session to the IP edge device. In this case, the access prompt information is obtained by the IP edge device from the server.

Figure 12:
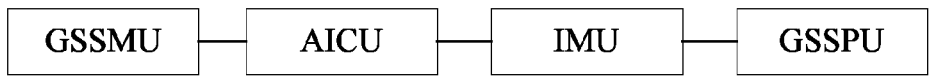
FIG. 12 shows an apparatus for processing access prompt information in an IP session in an embodiment of the present invention.

As shown in FIG. 12, an apparatus for processing access prompt information in an IP session (for example, an IP edge device) includes:
a GSSMU, configured to: manage the state of an IP session during an IP session process, and provide the access prompt information;
an AICU, configured to: obtain the access prompt information from the GSSMU, and then instruct an IMU to perform information mapping for the access prompt information;
the IMU, configured to: perform information mapping for the access prompt information so that the access prompt information is mapped to an access prompt information code, or map the access prompt information to an IP session control signaling message of a specified type, and send the mapped access prompt information to a GSSPU; and
the GSSPU, configured to: add the mapped access prompt information to the IP session control signaling message, and send the IP session control signaling message to the UE and/or policy server.

The mapped access prompt information sent by the IMU to the GSSPU may instruct the GSSPU to add the access prompt information to the specified IP session control signaling message.

Besides, the embodiments of the present invention provide a method and apparatus for processing access prompt information from the perspective of the UE or policy server.

A method for processing access prompt information includes: obtaining an IP session control signaling message that carries access prompt information of an IP session; and performing corresponding operations according to the access prompt information carried in the IP session control signaling message.

Figure 13:
FIG. 13 shows another apparatus for processing access prompt information in an embodiment of the present invention.

An apparatus for processing access prompt information is provided. The apparatus may be a UE or a policy server. As shown in FIG. 13, the apparatus includes:
a Session Signaling Process Unit (SSPU), configured to: receive an IP session control signaling message filled with access prompt information, and send the IP session control signaling message to an Info Adoption Unit (IAU);
the IAU, configured to: obtain the access prompt information in the IP session control signaling message, and send the access prompt information to an Info Prompt Unit (IPU); and
the IPU, configured to perform corresponding operations according to the access prompt information received from the IAU.

Through the method, the system and the apparatus provided herein, the IP edge device obtains the access prompt information during the IP session process, and adds the access prompt information obtained during the IP session process to an IP session control signaling message which is sent to the UE and/or policy server in time, thus improving the user experience in the IP session. After receiving the IP session control signaling message, the UE and/or policy server parses the message to obtain the access prompt information, and performs log backup for the obtained access prompt information, thus improving the efficiency of maintaining the IP session and reducing the operation cost. Besides, the access prompt information may carry some information pushed by the policy server actively, for example, advertisement information, thus increasing the operation cost of the broadband access.

It is understandable to those skilled in the art that all or part of the steps of the foregoing embodiments may be implemented by hardware instructed by a computer program. The program may be stored in a computer-readable storage medium. When being executed, the program performs the processes covered in the foregoing embodiments. The storage medium may be a magnetic disk, a Compact Disk (CD), a Read-Only Memory (ROM), or a Random Access Memory (RAM).

Although the invention has been described through several exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. In an Internet Protocol (IP) edge device, a method for providing access termination information to a User Equipment, comprising:
    setting up an Internet Protocol (IP) session for a User Equipment (UE);
    managing the IP session by determining when the IP session needs to terminate based on access termination information received by, or generated from, one or more of: a network management system; a policy server; or a policy document;
    based on the determined need to terminate the IP session, adding the access termination information to a Bidirectional Forwarding Detection (BFD) message in an Option field or a Diagnostic field thereof; and
    sending the BFD message that carries the access termination information to the UE so that the UE can perform corresponding operations according to the access termination information.

2. The method of claim 1, wherein the access termination information is a cause code obtained according to a table recording mapping relations between IP session termination causes and cause codes.

3. A communication system, comprising:
    an Internet Protocol (IP) edge device, configured to:
        set up an Internet Protocol (IP) session for a User Equipment (UE);
        manage the IP session by determining when the IP session needs to terminate based on access termination information received by, or generated from, one or more of: a network management system; a policy server; or a policy document;
        based on the determined need to terminate the IP session, add the access termination information to a Bidirectional Forwarding Detection (BFD) message in an Option field or a Diagnostic field of thereof; and
        send the BFD message to the UE; and
    the UE, configured to:
        receive the BFD message sent by the IP edge device; and
        perform corresponding operations according to the access termination information carried in the BFD message.

4. The system of claim 3, wherein the IP edge device is further configured to:
    provide a table recording mapping relations between IP session termination causes and cause codes; and
    obtain a cause code mapping to the access termination information according to the table recording mapping relations between IP session termination causes and cause codes.

5. A computer program product for use in an Internet Protocol (IP) edge device, the computer program product being stored on a non-transitory computer readable medium and including computer executable instructions that when executed by processor cause the IP edge device to perform the following:
    set up an Internet Protocol (IP) session for a User Equipment (UE);
    manage the IP session by determining when the IP session needs to terminate based on access termination information received by, or generated from, one or more of: a network management system; a policy server; or a policy document;
    based on the determined need to terminate the IP session, add the access termination information to a Bidirectional Forwarding Detection (BFD) message in an Option field or a Diagnostic field thereof; and
    send the BFD message that carries the access termination information to the UE so that the UE can perform corresponding operations according to the access termination information.

* * * * *